Figure 1:
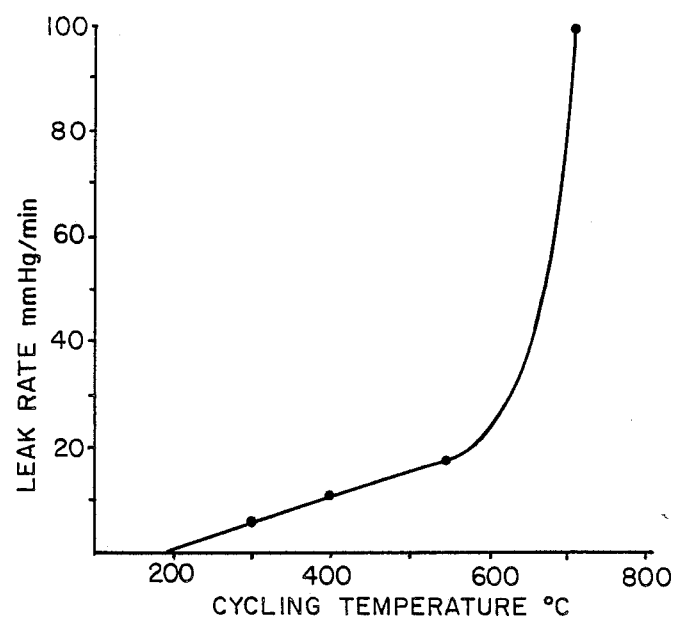

United States Patent [19]

Bright et al.

[11] Patent Number: 4,891,071
[45] Date of Patent: Jan. 2, 1990

[54] CEMENTITIOUS COMPOSITE MATERIAL WITH VACUUM INTEGRITY AT ELEVATED TEMPERATURES

[75] Inventors: Randall P. Bright, Bowie; Sean Wise, Millersville; Mark L. MacKenzie, Laurel, all of Md.

[73] Assignee: Cemcom Corporation, Lanham, Md.

[21] Appl. No.: 673,841

[22] Filed: Nov. 21, 1984

[51] Int. Cl.[4] .................... C04B 24/00; C04B 28/04
[52] U.S. Cl. ................................ 106/90; 106/97; 106/98
[58] Field of Search .............. 106/97, 98, 90, 314; 264/333, 129, 42

[56] References Cited

U.S. PATENT DOCUMENTS

| | | | |
|---|---|---|---|
| 3,972,969 | 8/1976 | Rio et al. | 264/42 |
| 4,002,788 | 1/1977 | Lott | 428/70 |
| 4,050,949 | 9/1977 | Lundgren et al. | 106/97 |
| 4,126,598 | 11/1978 | Leighter | 106/90 |
| 4,310,486 | 1/1982 | Cornwell et al. | 264/309 |
| 4,330,632 | 5/1982 | Haynes et al. | 106/90 |
| 4,382,820 | 5/1983 | Inoue | 106/90 |
| 4,482,385 | 11/1984 | Satkowski et al. | 106/97 |

FOREIGN PATENT DOCUMENTS

| | | | |
|---|---|---|---|
| 47-30608 | 8/1972 | Japan | 106/90 |
| 51-19300 | 2/1976 | Japan | 106/90 |
| 51-8198 | 3/1976 | Japan | 106/97 |
| 140354 | 8/1982 | Japan | 106/104 |
| 279404 | 12/1970 | U.S.S.R. | 106/90 |
| 459481 | 4/1975 | U.S.S.R. | 106/90 |

Primary Examiner—Mark L. Bell
Attorney, Agent, or Firm—Lawrence I. Field

[57] ABSTRACT

The temperatures at which the cementitious composite materials described in U.S. Pat. No. 4,482,385 can be used as tool or mold materials are extended by a treatment which comprises heating said composite materials to a temperature sufficient to expel free and adsorbed water from the concrete portion of the cementitious composite and thereafter refilling the resulting pores with an organic monomer or prepolymer and then crosslinking said impregnant to form an organic polymeric network in the inorganic composite material.

6 Claims, 1 Drawing Sheet

CEMENTITIOUS COMPOSITE MATERIAL WITH VACUUM INTEGRITY AT ELEVATED TEMPERATURES

This invention relates to a cementitious composite material which is useful as a tool or mold material at elevated temperatures. More particularly it relates to an improvement of the cementitious composite materials described in U.S. Pat. No. 4,482,385 issued Nov. 13, 1984.

The high strength cementitious tooling/molding material described in said patent has been found to perform quite satisfactorily at temperatures up to the order of 205° C., under conditions such that the material is required to retain its vacuum integrity, i.e., its impermeability in an autoclave while it is shaping a lightweight fiber reinforced epoxy material such as is commonly used in the aerospace industry. When used at higher temperatures, e.g., 260-400° C., the composite material of U.S. Pat. No. 4,482,385 has been found to develop a degree of porosity which renders it unsuitable for the intended purpose.

By modifying the cementitious composite material of said patent in accordance with the present invention, a product is produced which retains its vacuum integrity to higher temperatures, e.g., up to about 350-400° C.

Briefly the invention comprises heating the cementitious composite materials described in U.S. Pat. No. 4,482,385 to a temperature sufficient to expel free and adsorbed water from the concrete portion of the composite and to open up the pore structure of the composite materials, refilling the resulting pores with an organic monomer or prepolymer and thereafter polymerizing or crosslinking this prepolymer to form an organic polymeric network in the inorganic composite material. Depending to some extent upon the mcnomer selected and the manner in which the impregnation is performed, the resulting material is one which retains its vacuum integrity at temperatures above 200° C. and which may exhibit tensile and compressive strengths superior to those of the original material without impregnation.

Figure 2:
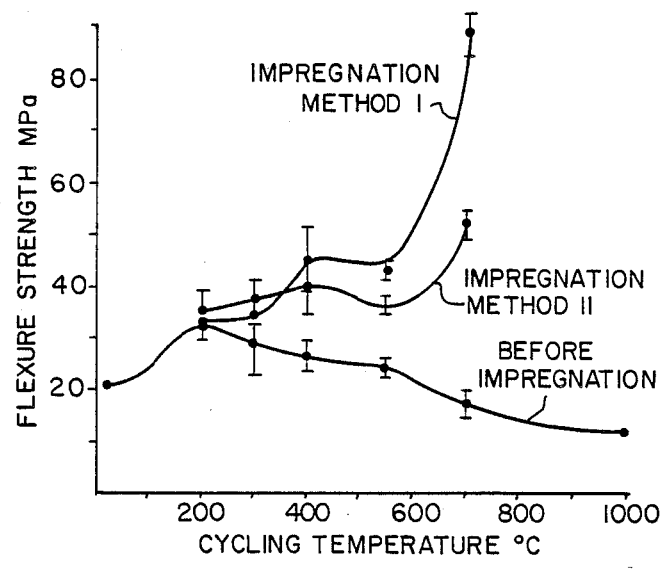

The invention will be better understood from the description which follows taken in conjunction with the drawings in which:

FIG. 1 is a graph showing surface leak rate as a function of temperature for the composite material of U.S. Pat. No. 4,482,385, and FIG. 2 is a graph showing flexure strength of said material before and after impregnation.

In the description which follows the original cementitious composite material comprised the following composition which is identified as the preferred composition in Table 1 of U.S. Pat. No. 4,482,385:

| | Weight % | Volume % |
| --- | --- | --- |
| Stainless Steel 10/25 | 34.8 | 16.1 |
| Stainless Steel 80/100 | 18.7 | 8.6 |
| Portland Cement (Class H) | 24.3 | 28.4 |
| Min-U-Sil (Fine quartz) | 11.8 | 16.2 |

-continued

| | Weight % | Volume % |
| --- | --- | --- |
| Silica Fume | 3.3 | 5.5 |
| Water | 6.2 | 22.4 |
| Mighty 150 (superplasticizer) | 0.9 | 2.8 |
| Tri n-butyl phosphate (defoamer) | 0.02 | 0.09 |

The cementitious composite was formed by adding the liquid components to the blended solid components, and stirred in a planetary mixer for periods of up to ten minutes. The tools and test samples are made by casting the mix over patterns made of wood, metal, gypsum or plastic. The patterns are prepared by applying a sealer to prevent any interaction between the cement and pattern material. They are then sanded and polished to give a smooth surface finish. Casting is done using 160 Hz vibration to help fluidize the cement mix and care is taken to ensure a smooth even flow of cement over the pattern surface to eliminate air bubble entrapment, particularly at the pattern surface. Both casting and curing on the pattern are carried out at ambient temperature. After 24 hours, the castings are removed from the pattern and subjected to the following curing schedule:

(i) 1 day in the mold at ambient room conditions
(ii) 1 day steam cure at 60° C. after demolding
(iii) 5 days at ambient room conditions--slow drying
(iv) 1.5 days dry thermal cure at 205° C.

Flexural test specimens of the composite of U.S. Pat. No. 4,482,385 were cast into a $1.3 \times 2.5 \times 30.5$ cm. mold. The samples were cured and oven dried according to the following schedule: 1 day in the mold at ambient room conditions; followed by 1 day steam cure at 60° C. after demolding; followed by 5 days slow drying at ambient room conditions; followed by 1.5 days dry thermal heat treatment at 205° C. Subsequently, the specimens were exposed to temperatures in a drying oven at 200° C., 300° C., 400° C., 500° C., 700° C., and 1000° C. Ramp rates were approximately 60° C./hour and the samples were held at peak temperature for 24 hours then permitted to cool slowly. Specimens were fractured under a three point bending test using a span of 12.1 cm.

Thermally treated specimens and the resin used for impregnation (a carboxyimide-modified novolac epoxy) were heated to 80° C. Two methods of impregnation were used. The first method (I) involved immersing the warmed sample in the warm resin, evacuating to draw air out of the pores and releasing the vacuum to drive resin into the pores. In the second method (II) warm resin was applied over the front face of a sample while a vacuum was applied on the opposite face thus drawing the resin into the pores. The specimens were placed in an oven at 120° C. while still in contact with the resin. After 45-90 minutes at this temperature, the resin gelled. The specimens were removed from the oven and the excess resin was cut away with a putty knife. They were then returned to the oven and the temperature was raised to 150° C. The specimens were allowed to cure for 17-20 hours. After cooling any residual resin was removed by sandpaper and the specimens were tested in flexure. The results are shown in the table which follows and in FIG. 2.

MATERIAL
Properties of Thermally Treated Material Before and After Impregnation

| Thermal Treatment Temp. °C. | Before Impregnation | | | Impregnation Method I | | Impregnation Method II | |
|---|---|---|---|---|---|---|---|
| | % Wt* Loss | Leak Rate mm/Hg/min | MOR MPa | % Resin Uptake | MOR MPa | % Resin Uptake | MOR MPa |
| 200 | 4.5 | 0.1 | 32.2 ± 2.4 | 0.29 | 33.6 ± 3.0 | 0.06 | 35.1 ± 3.9 |
| 300 | 5.0 | 6.0 | 28.8 ± 6.1 | 0.79 | 34.0 ± 1.4 | 0.47 | 37.2 ± 2.9 |
| 400 | 6.2 | 11.0 | 26.6 ± 2.8 | 2.0 | 45.2 ± 6.2 | 0.53 | 39.9 ± 5.1 |
| 550 | 6.6 | 18.0 | 24.1 ± 1.6 | 1.6 | 43.1 ± 1.7 | 0.67 | 36.3 ± 1.9 |
| 700 | 7.0 | 100.0 | 17.0 ± 2.2 | 6.6 | 88.7 ± 4.1 | 1.7 | 51.9 ± 2.8 |
| 1000 | Samples Oxidized | | 12.1 ± 1.0 | | | | |

*Weight loss for each temperature calculated from the weight at demolding.

In FIG. 2, it can be seen that the flexural strength of thermally treated, unimpregnated composite material reached a maximum of 32 MPa after cycling at 200° C. In the range of 200° C.-550° C., a steady decrease in strength occurred as the treatment temperature was increased. A substantial drop in strength, to 17 MPa, was observed when the unimpregnated material was treated at 700° C. At 1000° C., the metal aggregate in the unimpregnated material oxidized and severe degredation of the specimens was observed.

Samples thermally treated at 200° C. and then impregnated showed practically no resin uptake and no increase in flexural strength. Impregnated samples pretreated at 300° C. had flexural strengths 20-30% higher than before impregnation, even though resin uptake was less than one percent. Samples pretreated at 400° C. or 550° C. exhibited strength increases of about 75% on 1.6-2.0 percent resin uptake for Method I. Fifty percent strength increases on 0.5-0.7 percent resin uptake were obtained from Method II. Under microscopic examination, it was found that the resin penetrated approximately 1-4mm into the 300° C., 400° C. and 550° C. samples. Better uptake of the resin was achieved by Method I over Method II, possibly because the former involved complete immersion of the sample. Even so, for temperatures less than 700° C., neither method resulted in complete impregnation through the cross sections of the samples. Quite possibly the increases in flexural strength represent a surface strengthening effect.

The resin used for impregnation of the cementitious composite, a carboxy-imide-modified novolac epoxy, was a commercially available material sold as Novimide 700 Clear Resin sold by Isochem Resins Inc., and was mixed with a hardener (Pro 20 Hardener) in a ratio of 2:1 (Resin:hardener). It will be noted that no solvent or thinner is used, since elimination of such additives could result in unwanted porosity in the final product. The resin has a glass transition temperature of approximately 200° C. and degrades at about 400° C. Other high temperature resistant resins, monomers or prepolymers may be used provided they are thin enough to permit good impregnation. For example, polyimides, as prepolymers are one such class of high temperature resistant resins.

We claim:

1. In a process for producing an article comprising a high strength cementitious tooling/molding material containing a filler wherein a major constituent of the filler comprises stainless steel aggregate in a cementitious binder; and which exhibits vacuum integrity at temperatures up to about 350° C.; the improvement which consists in heating said article to a temperature of at least about 300° C. and up to the temperature at which said stainless steel aggregate oxidizes and for a time sufficient to develop surface porosity in said article, thereafter impregnating the surface portions of the resulting porous article with a crosslinkable organic prepolymer of a high ternperature resistant resin and thereafter polymerizing and curing the polymer in the surface pores of said article to produce a product which exhibits vacuum integrity at temperatures up to about 350° C. and with enhanced flexural strength at elevated temperatures as compared with an otherwise similar product without said impregnation with said prepolymer, polymerization and curing.

2. The product of the process of claim 1.

3. The process of claim 1 in which said prepolymer is a polyimide.

4. The process of claim 1 in which said temperature is between 400 and 700° C.

5. The process of claim 1 in which said prepolymer is a carboxy-imide-modified novolac epoxy.

6. The process of claim 1 in which said prepolymer is an epoxy.

* * * * *